H. H. CHAFFEE.
OVEN.
APPLICATION FILED JUNE 25, 1918.
1,349,494.
Patented Aug. 10, 1920.
2 SHEETS—SHEET 1.
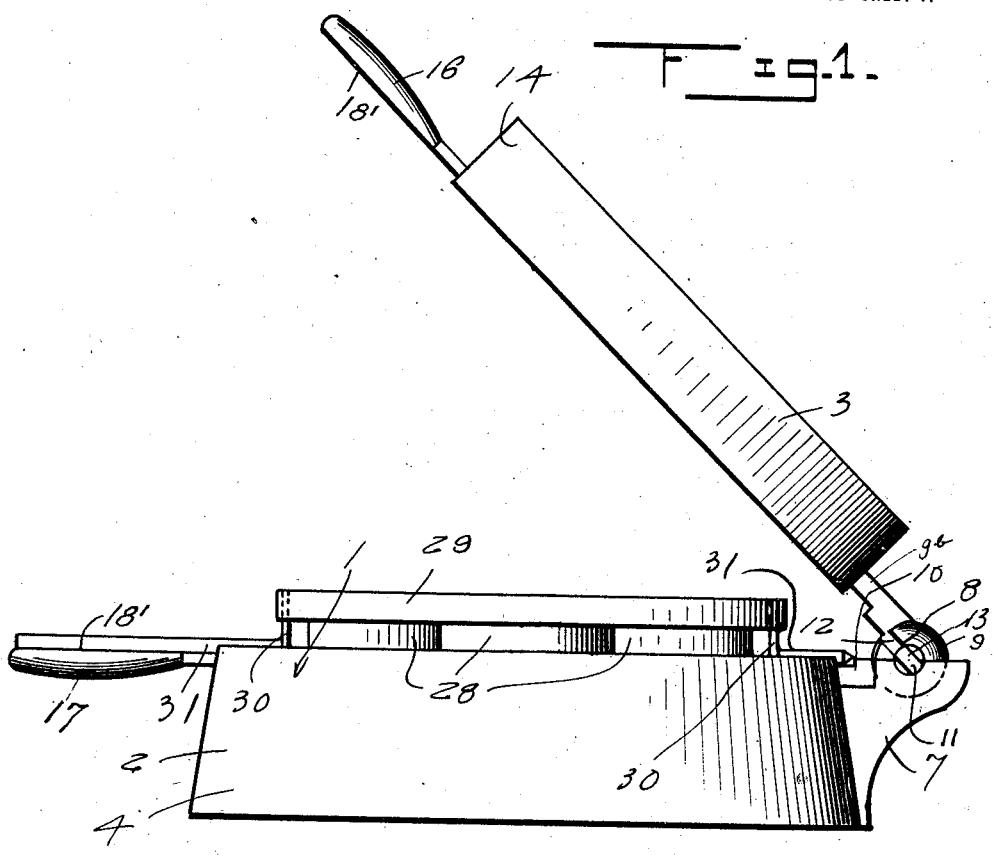
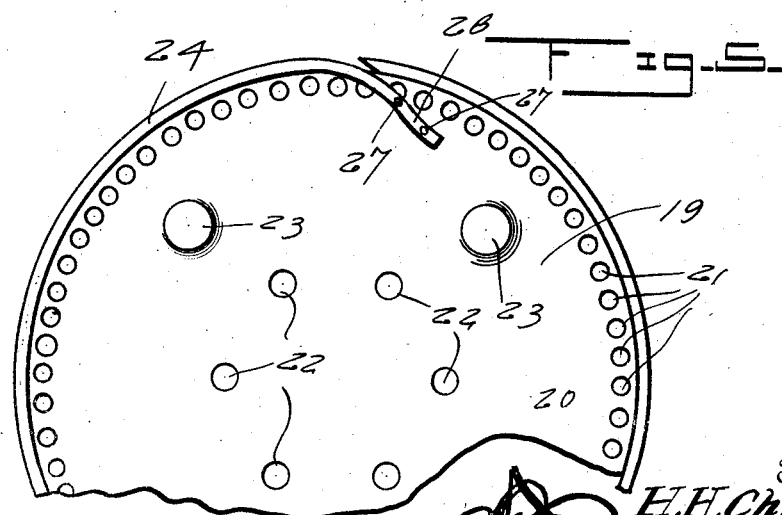
Inventor
H. H. Chaffee
By
Attorney H. H. CHAFFEE.
OVEN.
APPLICATION FILED JUNE 25, 1918.
1,349,494.
Patented Aug. 10, 1920.
2 SHEETS—SHEET 2.
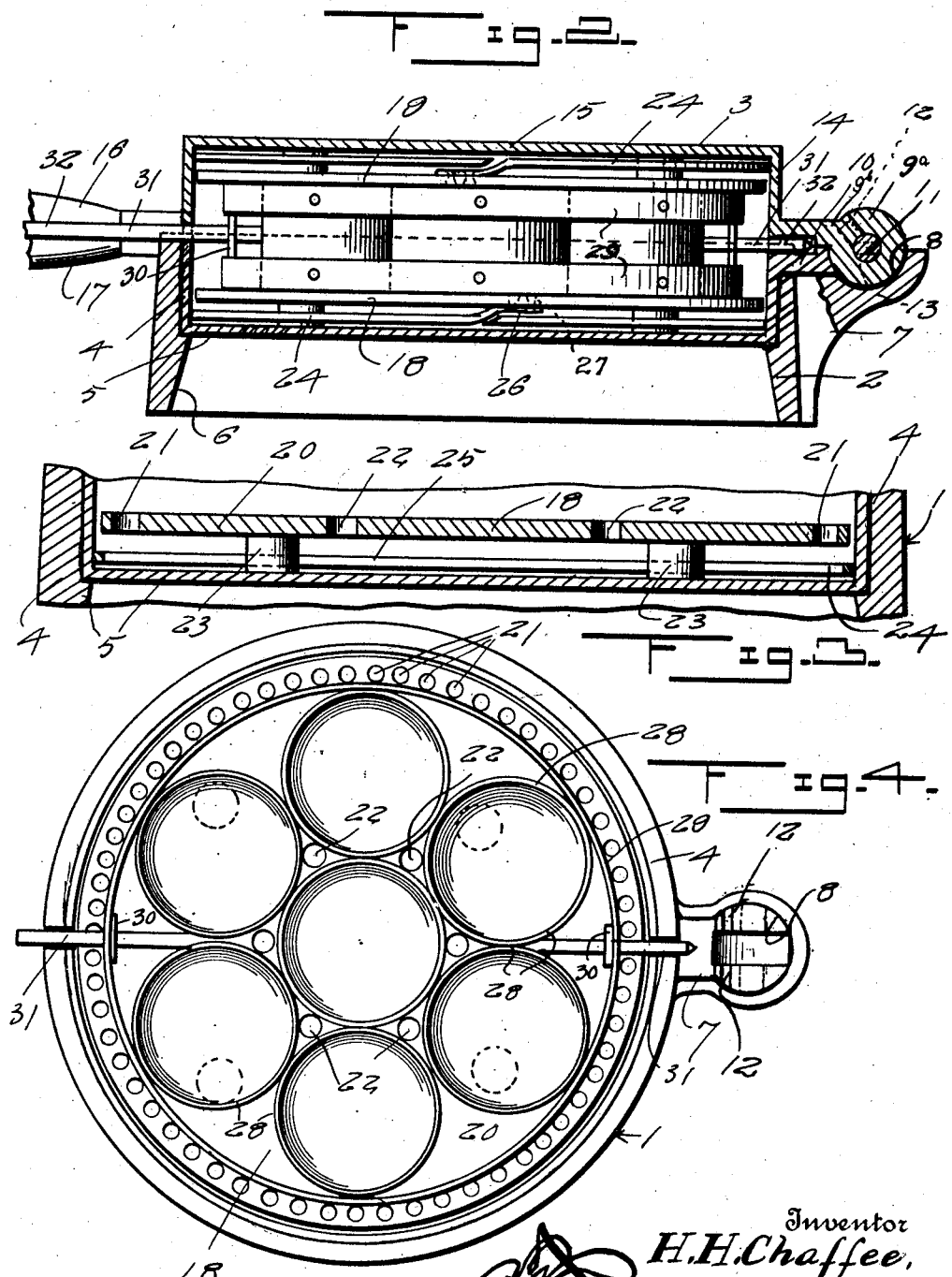

UNITED STATES PATENT OFFICE.

HERBERT H. CHAFFEE, OF SAN LEANDRO, CALIFORNIA.

OVEN.

1,349,494.   Specification of Letters Patent.   Patented Aug. 10, 1920.

Application filed June 25, 1918. Serial No. 241,783.

*To all whom it may concern:*

Be it known that I, HERBERT H. CHAFFEE, a citizen of the United States, residing at San Leandro, in the county of Alameda and State of California, have invented certain new and useful Improvements in Ovens; and I do hereby declare the following to be a full, clear, and exact description of the invention, such as will enable others skilled in the art to which it appertains to make and use the same.

This invention relates to ovens and the primary object of the invention is to provide an improved portable oven for use on top of stoves, of a compact nature, which will use only one burner or hole, and will effectively confine and distribute the heat therefrom, so that the articles in the oven will be readily cooked, with a minimum amount of fuel and time.

Another object of the invention is to provide an improved cooker or oven, which can be effectively used for baking bread, such as biscuits, muffins and the like, custards, beans or for frying doughnuts and popping corn and in which the parts thereof can be readily taken apart and used as skillets in the ordinary manner.

A further object of the invention is to provide an improved oven including a pair of pivotally connected skillets which can be readily reversed, so that the same can be readily heated to the desired degree and which are adapted to receive the articles to be cooked, and having false bottoms or plates therein, which are so formed as to effectively distribute the heat through the oven to evenly cook all portions of the articles placed therein.

Another object of the invention is to provide an improved means for detachably holding the false bottoms in position, whereby the same are prevented from accidental displacement during the cooking operation.

A still further object of the invention is to provide an oven of the above character having a plurality of rigidly connected rings, which are adapted to be placed in the oven and which are connected with the oven in such a manner that the same can be readily reversed, so that the articles in the rings can be readily cooked from the top and bottom.

A still further object of the invention is to provide an improved cooker of the above character, which is durable and efficient in use, one that is simple and easy to manufacture, and one that can be placed upon the market at a reasonable cost.

With these and other objects in view the invention consists in the novel construction, arrangement and formation of parts, as will be hereinafter more specifically described, claimed and illustrated in the accompanying drawing, forming a part thereof in which:

Figure 1 is a side elevation of the improved oven, showing the top skillet in its raised position, Fig. 2 is a vertical longitudinal section through the same, Fig. 3 is an enlarged fragmentary vertical horizontal section through the bottom skillet or base showing the false bottom therein and the means for holding the same in position, Fig. 4 is a plan view of the improved oven showing the top skillet or cover removed therefrom, and Fig. 5 is a fragmentary bottom plan view of one of the false bottoms.

Referring to the drawings in detail, wherein similar reference characters designate corresponding parts throughout the several views, the numeral 1 generally indicates the improved portable oven, which includes an annular base 2, an upper skillet 3 and a lower skillet 4. The base 2 includes a cylindrical body 5, the inner lower surface of which is inclined inwardly as at 6, so that the heat arising from the heating source will be confined within the body, to allow the bottoms of the skillets to be evenly heated. An attaching lug 7 is formed on the outer surface of the base 2 and extends above the top surface of the base and is provided with a semispherical socket 8 in which is adapted to be positioned the ball member 9 formed on the arm 10 carried by the free edge of the lower skillet 4. The ball member 9 is provided with a diametrically extending aperture, which communicates with a diagonally extending slot 12, which slidably receives the pivot pin 11, which extends from the circular member 9$^a$ carried by the free end of the arm 9$^b$ formed on the upper skillet 3. The terminals of the pivot pin 11 carried by the circular member 9$^a$ are flattened as at 13 and it will be seen that when the upper skillet plate is tilted at an angle of 45 degrees, the pivot pin can be readily slipped out of the apertures through the grooves 12 and the skillets readily detached, and thus allow the same to be used as separate cooking utensils in the ordinary manner.

The upper skillet 3 and the lower skillet each include the cylindrical side wall or body 14 and an end wall 15. When the skillets are in their closed position, as clearly shown in Fig. 2 a complete closed housing is formed. Handles 16 and 17 are formed on the inner meeting edges of the upper and lower skillets 3 and 4 and extend outwardly therefrom and are diametrically opposite the pivot point of the skillets and form means whereby the oven can be readily handled and the skillets operated in relation to one another. The inner surfaces thereof are flattened, as at 18' for a purpose which will hereinafter more fully appear.

False bottoms or heating plates 18 and 19 are arranged to be placed in the lower and upper skillets and each includes a circular plate 20 having an outer annular row of perforations 21 and an inner concentric annular row of perforations 22, which provides means whereby the heat may be readily circulated and distributed through the oven. The outer surfaces of the false bottoms 18 and 19 are provided with a plurality of spaced legs 23 on their outer surfaces which are arranged to engage the inner surfaces of the walls of the upper and lower skillets, so as to space the plates therefrom. The plates are held against accidental movement by means of springs 24 and 25, which are secured to the false bottoms 18 and 19 and arranged to engage the inner surfaces of the sidewalls of the skillets so as to frictionally engage the same and hold the bottoms in position. The springs 24 and 25 are of substantially annular formation and are of the expansion type and have one end bent inwardly as at 26 into engagement with the outer surfaces of the false bottoms and secured thereto by suitable rivets 27.

The articles to be cooked are placed into the skillets between the bottoms 18 and 19 and it will be seen from the formation of the same the heat will be evenly distributed through the articles whereby the same will be evenly and readily cooked.

When it is desired to cook muffins or biscuits or the like a plurality of annular rings 28 which are preferably made of aluminum, or the like are inserted between the false bottoms and the dough is placed therein and the oven is used in the ordinary manner. The rings 28 are rigidly connected together and include an outer annular row of rings and a central ring and the outer rings are held together at their upper and lower edges by a pair of spaced bands 29, which are held in spaced relation at diametrically spaced points by means of braces 30. The braces 30 carry outwardly extending shafts 31 which are adapted to seat in substantially semi-circular grooves 32 formed in the meeting edges of the upper and lower skillets 2 and 3. One of the shafts 31 adjacent to the handles 16 and 17 is extended to provide a handle 32, which is positioned intermediate the handles 16 and 17 and forms means whereby the rings can be readily inserted into the skillets or the position thereof reversed, whereby biscuits or the like can be cooked in the top or bottom.

When it is desired to reverse the position of the rings 28 in the skillets, the upper skillet 3 is raised as clearly shown in Fig. 1 and the handle 32 is grasped and raised upwardly until the rings are entirely out of engagement with the lower skillet, at which time the same are rotated at the outer shaft 31. The rings are then lowered in the lower skillet and the upper skillet is then closed.

When it is desired to reverse the position of the skillets, the handles 16 and 17 are grasped in one hand, after which the skillets are swung upwardly upon the ball and socket joint until the lower skillet is raised clear of the base 2. While holding the skillets in that position, they are turned upon the ball and socket joint until they are reversed, after which they are lowered into normal position with respect to the base 2.

From the foregoing description it can be seen that an improved oven is provided, which is adapted to be positioned on top of the stove, which is of exceedingly simple and durable construction, in which the articles being cooked can be cooked at an even temperature and thoroughly cooked in a reliable and efficient manner.

In practice, I have found that the form of my invention, illustrated in the accompanying drawings and referred to in the above description, as the preferred embodiments, is the most efficient and practical; yet realizing the conditions concurrent with the adoption of my device will necessarily vary, I desire to emphasize the fact that various minor changes in details of construction, proportion and arrangement of parts may be resorted to, when required, without sacrificing any of the advantages of my invention as set forth.

What I claim as new is:

1. A portable oven comprising a pair of sections, means detachably and pivotally connecting the sections together, false bottoms arranged in each section, means for spacing the bottoms from the upper and lower walls of the sections, the false bottoms being provided with a plurality of perforations, and springs carried by the false bottoms arranged to engage the sections to prevent accidental displacement thereof.

2. A portable oven comprising upper and lower sections, means pivotally and detachably connecting the sections together, an operating handle for each section, perforated false bottoms carried by each section, outstanding legs carried by the outer surfaces of the false bottoms and arranged to engage the upper and lower walls of the sections to space the plates therefrom, and annular contractile coil springs carried by the false bottoms arranged for engaging the side walls of the sections to prevent accidental movement of the false bottoms, and as for the purpose specified.

3. An oven comprising upper and lower sections, means detachably and pivotally connecting the sections together, an intermediate section including a plurality of rings, annular strips connecting the rings together, and shafts carried by the annular strips for engaging the inner surfaces of the upper and lower sections.

4. An oven comprising upper and lower sections, means detachably connecting the sections together, an intermediate member including a plurality of rigidly connected rings, annular members connecting the outer surfaces of the rings together, shafts carried by the annular member, the inner meeting surfaces of the sections having alined grooves arranged to receive the shafts, and a handle carried by the shafts, as and for the purpose specified.

5. An oven comprising a base, a socket formed on the base, a pair of skillets arranged in the base, a ball carried by one of the skillets, and rotably fitted in the sockets, said ball having a diametrically extending opening and an inclined slot communicating therewith, a transverse pin carried by the other skillet and arranged to be slidably received in said slot, whereby the same can be readily positioned in said opening, the outer terminals of the pins being flat to conform in configuration with said slot, as and for the purpose specified.

In testimony whereof I affix my signature in presence of two witnesses.

HERBERT H. CHAFFEE.

Witnesses:
 VIOLET FRATERS,
 GEO. PYLES.